US012407614B2

(12) United States Patent
Nainar et al.

(10) Patent No.: US 12,407,614 B2
(45) Date of Patent: Sep. 2, 2025

(54) END-TO-END NEUTRAL HOST NETWORK-AS-A-SERVICE

(71) Applicant: Cisco Technology, Inc., San Jose, CA (US)

(72) Inventors: Nagendra Kumar Nainar, Morrisville, NC (US); Carlos M. Pignataro, Cary, NC (US); Akram Sheriff, Newark, CA (US); Vinay Saini, Karnatka (IN); Rajesh Indira Viswambharan, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 274 days.

(21) Appl. No.: 18/206,245

(22) Filed: Jun. 6, 2023

(65) Prior Publication Data
US 2024/0414089 A1 Dec. 12, 2024

(51) Int. Cl.
*H04L 47/10* (2022.01)
*H04L 45/12* (2022.01)
*H04L 47/2425* (2022.01)

(52) U.S. Cl.
CPC ............ *H04L 47/18* (2013.01); *H04L 45/123* (2013.01); *H04L 47/2425* (2013.01)

(58) Field of Classification Search
None
See application file for complete search history.

(56) References Cited

U.S. PATENT DOCUMENTS

| | | | | |
|---|---|---|---|---|
| 11,444,871 B1 * | 9/2022 | Nainar | ................ | H04L 63/0272 |
| 11,803,453 B1 * | 10/2023 | Bunker | ............... | G06F 11/0751 |
| 2005/0129026 A1 * | 6/2005 | Chang | ................... | H04L 65/403 |
| | | | | 370/395.2 |
| 2006/0031515 A1 * | 2/2006 | Van Gassel | ........... | H04W 88/04 |
| | | | | 709/227 |
| 2011/0264909 A1 * | 10/2011 | Ejzak | .................... | H04W 8/082 |
| | | | | 713/153 |
| 2016/0197850 A1 | 7/2016 | Peng et al. | | |
| 2017/0063648 A1 | 3/2017 | Nadaf et al. | | |
| 2017/0064717 A1 | 3/2017 | Filsfils et al. | | |

(Continued)

OTHER PUBLICATIONS

Search Report and Written Opinion for International Application No. PCT/US2024/032535, Dated Sep. 10, 2024, 15 pages.

*Primary Examiner* — Mohamed Ibrahim
(74) *Attorney, Agent, or Firm* — Lee & Hayes, P.C.

(57) ABSTRACT

Techniques for determining an optimal connection path by a NHNaaS are described. The techniques may include receiving a registration from an IPS that includes service ISP service parameters, and storing the registration in a NaaS database. A request to connect to a remote service from a user device, including user parameters required is received. ISPs having respective service parameters compatible with the user parameters are identified in the NaaS database. Multiple paths offered by the service providers between the user device and the remote service are determined. Network performance data for each path is received from a network monitoring service. Using the network performance data, an optimal path for establishing the connection is identified. A request to instantiate a tunnel between the user device and remote service is transmitted to the service providers along the optimal path and the tunnel information is transmitted to the user device.

20 Claims, 6 Drawing Sheets

(56) References Cited

U.S. PATENT DOCUMENTS

| | | |
|---|---|---|
| 2017/0078410 A1 | 3/2017 | Rao |
| 2017/0302474 A1 | 10/2017 | Li et al. |
| 2019/0103991 A1 | 4/2019 | Cidon et al. |
| 2022/0030075 A1 | 1/2022 | Smith et al. |

* cited by examiner

END-TO-END NEUTRAL HOST NETWORK-AS-A-SERVICE

TECHNICAL FIELD

The present disclosure relates generally to an end-to-end neutral host network-as-a-service (NHNaaS) that leverages a holistic visibility of the internet and identifies an optimal path for a connection between a user device and a remote service.

BACKGROUND

In today's competitive market, networks are critical resources for organizations. The ability to transmit data accurately and in a timely manner, is vital to the success of any enterprise organization. However, owning, building, and managing the hardware and software necessary to maintain a network is time consuming and expensive. Thus, Network-as-a-service (NaaS) is an emerging model for organizations to consume network infrastructure through flexible operating expense subscriptions. NaaS include hardware, software, management tools, licenses, and lifecycle services. NaaS provides a flexibility to pay for services based on usage and to scale up or down as business needs change. NaaS providers across the Internet create dynamic service level agreement (SLA) aware tunnels across different point-of-presence (POP) locations and steer customer traffic over the tunnel. Different service providers offer different types of services and cover different parts of the Internet in different parts of the world. For example, some service providers offer traffic engineering services in their internal network, while other service providers offer software defined cloud interconnect (SDCI) services. Additionally, some mobile providers offer SLA slices over public 5G, while some corporations may have their own private 5G network. Furthermore, some wireless providers may register with Open Roaming to offer wireless as an access network with guaranteed SLA at the access layer. Because of the plethora of service options having different services and covering different parts of the world, it can be quite challenging for users to consume the service efficiently. Additionally, different service providers may offer a multitude of different transport services and encapsulation. Different service providers may offer different value-added services such as deep packet inspection (DPI), firewalls, proxy, and the like. In addition, some service provider may even offer different services for different POP locations. Thus, when a customer requires a specific set of services for establishing a connection to a remote service, it may be extremely difficult to ensure that all the service providers along a connection path support all the services required for establishing the connection between the customer and the remote service.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes method(s) for identifying an optimal path for establishing a connection between a user device and a remote service, the method may be performed at least in part by an end-to-end neutral host network-as-a-service (NaaS). The method includes receiving a registration from an internet service provider, the registration including service parameters associate with the internet service provider. In addition, the method includes storing the registration with the service parameters in a NaaS database. The method also includes, receiving, from a user device, a request for a connection to a remote service, the request including user parameters required for the connection. Additionally, the method includes, identifying, in the NaaS database, service providers that provide connections having respective service parameters that are compatible with the user parameters. The method also includes determining multiple paths offered by the service providers between the user device and the remote service. The method may also include, receiving, from a network monitoring service, network performance data for each path of the multiple paths. The method may also include identifying, using the network performance data and from the multiple paths, an optimal path for establishing the connection between the user device and the remote service paths. Additionally, the method includes transmitting a request to service providers along the optimal path to instantiate a tunnel between the user device and the remote service. Finally, the method includes transmitting, to the user device, information relating to the tunnel.

Additionally, the techniques described herein may be performed by a system and/or device having non-transitory computer-readable media storing computer-executable instructions that, when executed by one or more processors, performs the method described above.

Example Embodiments

As described above. Network-as-a-service (NaaS) is an emerging model for organizations to consume network infrastructure through flexible operating expense subscriptions. NaaS provides a flexibility to scale up or down as business needs change, and providers across the Internet can create dynamic service level agreement (SLA) aware tunnels across different point-of-presence (POP) locations and steer customer traffic over the tunnel. However, different Internet service providers offer different types of services and cover different parts of the Internet in different parts of the world. Additionally, different service providers may offer different transport services and encapsulation. Different service providers may offer different value-added services such as deep packet inspection (DPI), firewalls, proxy, and the like. In addition, some service provider may even offer different services for different POP locations.

Although NaaS provides improved network management, as a service provider manages a network for an organization, allowing the organization to focus on running their business, NaaS lacks path control over the Internet. Within a domain, existing technologies like traffic engineering to classify the data traffic based on requirements and steer data traffic over the network is seamlessly incorporated with NaaS. However, because the internet is a combination of different network domains managed by different Internet service providers that kind of control is not present for end-to-end connections. Additionally, NaaS does not provide for on-demand path provisioning to cater to specific needs. With the explosion of cloud computing, edge computing, and fog computing, applications and services hosted dynamically at different edges are becoming a common scenario. Providing SLA-centric connectivity dynamically, for end-users connected from anywhere (e.g., hybrid workers) to such clouds, SaaS, and edge services is becoming fundamental and cannot be achieved by a single NaaS provider.

Once data traffic exits the network of a customer's service provider, the data traffic is out of control of the customer's service provider and typically relies on border gateway protocol (BGP) best path selection. One problem with this environment is that, as described above, each service provider has its own limited-service offerings, which may not comply with service requirements of a customer. For example, a customer requesting a connection to a remote service may require deep packet inspection (DPI), which is offered by their service provider, however when their data traffic exits the network of their service provider, there is no guarantee that each network the data traffic travels through with BGP best path selection offers DPI. Another example of a problem that arises with end-to-end connectivity is end-to-end encapsulation, as different service providers may support different encapsulation, or overlay connectivity. A customer requesting a connection to a remote resource may not be aware of the different encapsulation or overlay that are supported along the path between the customer and the remote resource.

This disclosure describes techniques for identifying an optimal path between a user device and a remote service and ensuring that each service provider along the path is compatible with user service requirements. An end-to-end federated service spanning different providers is described here. This federated service or neutral host NaaS (NHNaaS) extends the idea of NaaS across the Internet in a vendor agnostic, technology agnostic, and service provider agnostic implementation.

Service providers register with a NHNaaS using a network application programming interface (API). The registration includes details of the service parameters each service provider is capable of providing, such as supported transport services (e.g., Spectrum Resource as a Service (SRaaS), Traffic Engineering as a service (TEaaS), Wireless, Pub5G, Priv5G, or any other appropriate transport service), supported value-added services (e.g., DPI, FW, Proxy, etc.), supported encapsulation (e.g., IPv6, SRv6, MPLS, SR-MPLS, NSH, etc.), and SLA's that are supported. In some examples, additional supported security is included in the registration. In some examples, information relating to different POP locations supporting different services within a network will be included in the registration. Any information relating to any type of service the service provider supports will be included in the registration with the NHNaaS. In some instances, the service providers that register with NHNaaS may be a global service provider that offers service across the globe, such as major telecom or internet service providers. In other instances, the service providers may be regional and provide services locally or within a specific geographical location (e.g., Priv5G offered by an enterprise in a city). Still in other instances, a service provider may be more granular where a store offering wireless network access within a shopping center may register with the NHNaaS. The service provider registrations, including the service parameters they support, are stored and maintained in a NaaS database by the NHNaaS. The NaaS database contains up to date information relating to service parameters that each registered service provider supports.

Additionally, the NHNaaS leverages Internet performance data and insight from an external network monitoring service such as ThousandEyes, Accidean, or any other service that provides holistic visibility of the Internet, to identify well performing paths. When a customer transmits a request to the NHNaaS for a connection to a remote resource, the NHNaaS may receive the end-to-end path request from a network API, or the request may be embedded with other services such as DNS for example. The connection request includes service parameters that are required by the customer for the requested connection. The NHNaaS searches the NaaS database for service providers that comply with the user parameters included in the connection request. The NHNaaS may then compute multiple paths across multiple providers that have service parameters that comply with the user parameters required for the connection. The NHNaaS may then leverage the holistic view of the internet from a network monitoring service, to determine an optimal path between the customer and the remote service. The NHNaaS sends the BGP path information for the multiple paths that comply with the user parameters to the network monitoring service and the network monitoring service can determine performance data for each path. Thus, the best or optimal path is a path that has the best performance between the customer and the remote resource as well as complies with the user parameter requirements.

Once an optimal path is determined, the NHNaaS transmits a request via a network API to the service providers along the optimal path to instantiate an SLA aware tunnel from the customer to the remote resource along the optimal path. The network API request will be sent to the respective providers along with POP, SLA, encapsulation, etc. details to create the relevant path. The stitching details are requested as desired to stitch the end-to-end tunnel across different providers along the optimal path. In the case of Priv5G or Pub5G available as an access point, the relevant SLA aware slices can be created across one or more providers by anchoring the user plane function (UPF) session on one of the NHNaaS edges and stitch the tunnel to the remaining part of the tunnel across the provider.

The NHNaaS also informs the customer of the relevant details to establish the connection. For example, the relevant information may include an encapsulation header, a first hop identity, a sliceID, and any other information necessary that relates to transmitting data traffic through the tunnel along the optimal path. In some instances, a customer may request a one-time path provisioning and in other instances, a customer may request continuous monitoring and optimization that can leverage a make-before-break approach to build a new tunnel before clearing an existing one when an optimal path is determined to no longer be optimal. In other words, the NHNaaS can facilitate dynamically modifying or updating a tunnel based on real-time performance visibility received from a network monitoring service.

Unlike traditional routing decisions, the federated service of a NHNaaS that spans different providers requires more than basic routing decisions. A request from a user device may trigger path decisions based on the end-to-end encapsulation, value-added services, cost, compliance requirements, security, etc. The holistic visibility of different services offered by different providers in different POP locations helps provision the relevant cross-domain, cross-layer, cross-service path that satisfies the user parameters required for the end-to-end connection.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
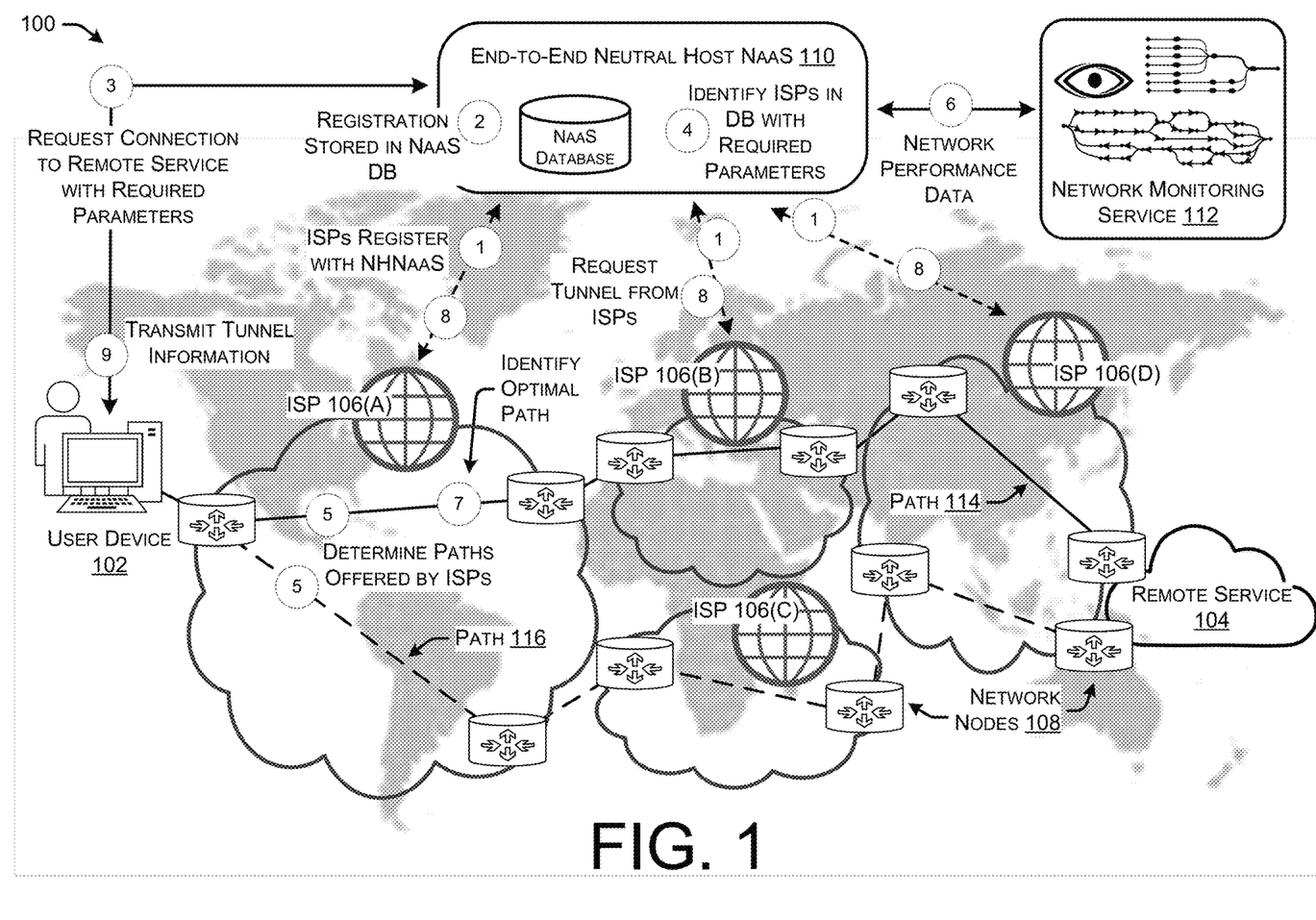
FIG. 1 illustrates an example network that may implement various aspects of the technologies directed to determining an optimal network path using NHNaaS as described herein.

FIG. 1 illustrates an example environment 100 that may implement various aspects of the technologies directed to a NHNaaS. Environment 100 includes user device 102, which may represent any customer, individual, enterprise organization, etc. using the Internet to connect to a remote service 104. The remote service may represent any remote resource, application, etc. that provides a service for the user device 102. Environment 100 also include multiple internet service providers (ISPs) 106. ISP 106(A), ISP 106(B), ISP 106(C), and ISP 106(D) represent the multiple service providers networks connected across the globe that make up the Internet. Each ISP is a network of interconnected computing devices that can exchange data and share resources with each other. The network devices may include hubs, switches, routers, bridges, gateways, access points, etc. and are represented as network nodes 108 in FIG. 1. Environment 100 also include an end-to-end neutral host network-as-a-service (NHNaaS) 110. The NHNaaS 110 includes a NaaS database for storing registration information and service parameters for each IPS 106 that registers with the NHNaaS 110. Also included in environment 100 is a network monitoring service 112. The network monitoring service may be a service like ThousandEyes, Accidean, or any other network monitoring service that provides a holistic view of the Internet and maps Internet performance. Finally, environment 100 includes path 114 and path 116 that represent multiple paths across the Internet between user device 102 and remote service 104.

To implement techniques for identifying an optimal path for a connection between a user device 102 and remote service 104 leveraging an end-to-end NHNaaS 110, at (1) each ISP 106 registers with the end-to-end NHNaaS. The registration includes service parameters provided by each respective ISP. For example, the service parameters may include transport services supported (e.g., SRaaS, TEaaS, Wireless, Pub5G, Priv5G, etc.), encapsulation supported (IPv6, SRv5, MPLS, Sr-MPLS, NSH, etc.), POP locations and their supported services, security services, SLA information, value-added services (DPI, FW, Proxy, etc.), and any other information relating to services that are provided by the respective ISP 106. At (2) the NHNaaS stores the registration information, including service parameters, in a NaaS database.

At (3) user device 102 sends a connection request to the end-to-end NHNaaS 110 requesting a connection to the remote service 104. The connection request includes user parameters that the user associated with the user device requires for connection. At (4) when the end-to-end NHNaaS 110 receives the connection request from the user device 102, the end-to-end NHNaaS 110 searches the NaaS database for the ISPs 106 that have service parameters that comply with the user parameters required for connection to the remote service 104. At (5) after the ISPs 106 that have service parameters that comply with the user requirements specified in the connection request have been identified, the end-to-end NHNaaS 110 determines multiple paths over the Internet between the user device 102 and the remote service 104 offered by the ISPs 106 that comply with the user parameter requirements. Environment 100 shows path 114 and path 116 as representing the multiple paths offered by the service providers that comply with the user requirements, however any number of paths may be determined to comply with the user parameters.

At (6) the end-to-end NHNaaS 110 may query the network monitoring service 112 for performance information for each path of the multiple paths determined in the previous step. The end-to-end NHNaaS 110 may provide the network monitoring service 112 with routing information for each determined path, path 114 and path 116, and leveraging a holistic view of the Internet, the network monitoring service 112 can provide the end-to-end NHNaaS 110 with performance data for path 114 and path 116. At (7) based on the performance data of each path of the multiple paths offered by the ISPs that comply with the user parameter requirements, the end-to-end NHNaaS identifies an optimal path, in the example illustrated in environment 100, path 114 is the optimal path. Although both path 114 and path 116 travel through ISPs that comply with the user parameters required by user device 102, path 114 has better performance data as determined by network monitoring service 112.

Once the optimal path has been identified, at (8) the end-to-end NHNaaS 110 sends a request via network API to the ISPs 106 along the optimal path (ISP 106(A), ISP 106(B), and ISP 106(D)) to instantiate a tunnel between the user device 102 and the remote service 104. Finally, at (9) the end-to-end NHNaaS 110 transmits the information relating to the tunnel to the user device 102, such as encapsulation header, first hop identity, sliceID, etc. In some examples, a user device 102 may request a one-time path provisioning as described above, and in another example, the user device 102 may request continuous monitoring and optimization such that if the optimal path identified ceases to be optimal, the tunnel may be dynamically updated, modified, or a new optimal tunnel may be instantiated before a teardown message is send to clear the original tunnel in a make-before-break approach to ensure that the connection between the user device 102 and the remote service 104 is always optimal.

Figure 2:
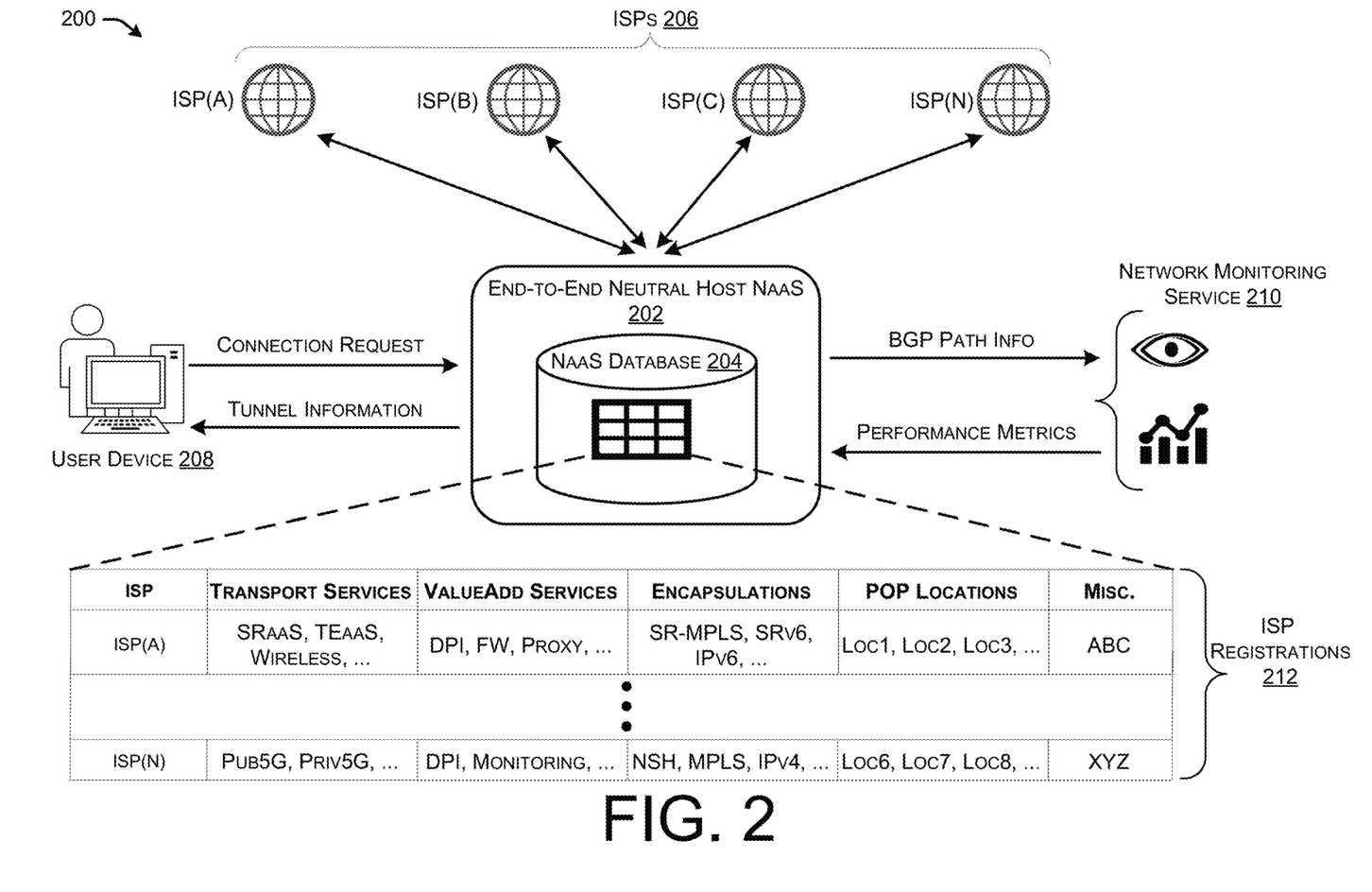
FIG. 2 illustrates an example optimal path network connection that may be implement by a NHNaaS and NaaS database as described herein.

FIG. 2 illustrates an example environment 200 that may implement various aspects of the technologies directed to a NHNaaS. Environment 200 illustrates an end-to-end NHNaaS 202 that includes a NaaS database 204 for storing information relating to registered service providers such as ISPs 206 (ISP (A), ISP (B), ISP (C), and ISP (N)). Environment 200 also includes a user device 208 that initiates a connection to a remote service (not shown). Environment 200 also include a network monitoring service 210 and illustrates a representation of information relating to ISP registrations 212 stored in the NaaS database 204. The registrations include service parameters provided by each respective ISP 206. For example, the service parameters may include transport services supported (e.g., SRaaS, TEaaS, Wireless, Pub5G, Priv5G, etc.), encapsulation supported (IPv6, SRv5, MPLS, Sr-MPLS, NSH, etc.), POP locations and their supported services, security services, SLA information, value-added services (DPI, FW, Proxy, etc.), and any other information relating to services that are provided by the respective ISPs 206. For example, ISP (A) registers with the end-to-end NHNaaS 202 and includes the transport services supported, value added service supported, encapsulation supported, POP locations and any miscellaneous information regarding services supported by ISP (A).

When the user device 208 sends a connection request to the NHNaaS 202 as shown, the connection request includes user parameters that the user device 208 requires for connection to a remote service. When the NHNaaS 202 receives the request, the NHNaaS 202 searches the NaaS database 204 and identifies the ISPs 206 that support the user parameter requirements sent in the connection request. Using the identified ISPs 206 the NHNaaS can determine multiple paths offered by the service providers between the user device 208 and the remote service. The end-to-end NHNaaS 202 send this path information to the network monitoring service 210 and queries the network monitoring service 210 for performance data for each path of the multiple paths. Once the performance data is received, the end-to-end NHNaaS 202 can identify an optimal path for establishing the connection between the user device 208 and the remote service. The NHNaaS 202 transmits a request to each ISP 206 along the optimal path to instantiate a tunnel between the user device 208 and the remote service and transmits the information relating to the tunnel to the user device 208.

Figure 3:
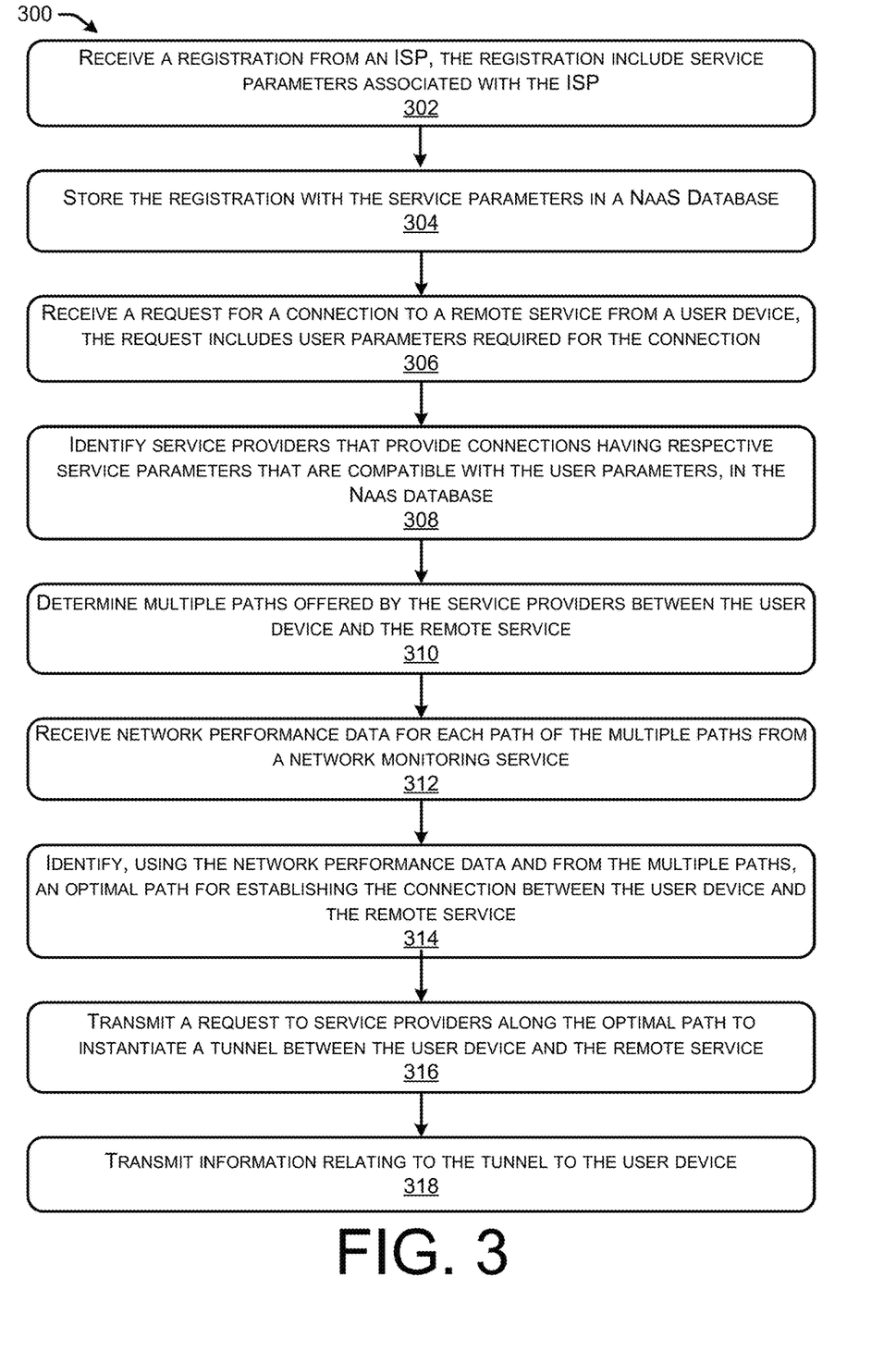
FIG. 3 is a flow diagram illustrating an example method associated with the techniques described herein for identifying an optimal path between a user device and a remote service by leveraging a NHNaaS.

FIG. 3 is a flow diagram illustrating an example method 300 associated with the techniques described herein for identifying an optimal path between a user device and a remote service by leveraging a NHNaaS. Example method 300 illustrates aspects of the functions performed at least partly by the end-to-end neutral host NaaS 110 and/or ISPs 106, network nodes 108, and the network monitoring service 112 as described in FIG. 1. The logical operations described herein with respect to FIG. 3 may be implemented (1) as a sequence of computer-implemented acts or program modules running on a computing system and/or (2) as interconnected machine logic circuits or circuit modules within the computing system. In some examples, the method(s) 300 may be performed by a system comprising one or more processors and one or more non-transitory computer-readable media storing computer-executable instructions that, when executed by the one or more processors, cause the one or more processors to perform the method(s) 300.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 302, an end-to-end neutral host network-as-a-service (NHNaaS) receives a registration from an ISP, the registration includes service parameters associated with the ISP. For example, with reference to FIG. 1 at (1) each ISP registers with the end-to-end NHNaaS 110. The ISPs may use a network API to register and send all the relevant details required to register. When an ISP registers, the registration includes parameters associated with the ISP's service capabilities. For example, with reference to FIG. 2, each ISP that registers with the end-to-end NHNaaS 202 includes parameters such as supported transport services, supported value-added services, supported encapsulation, POP locations and any other service the ISP may support.

At operation 304, the registration is stored in a NaaS database. For example, referring to FIG. 1 at (2) the registrations, including the service parameters, received by the end-to-end NHNaaS and from the ISPs, are stored in the NaaS database of the end-to-end NHNaaS. Referring to FIG. 2, the NaaS database 204 is shown as a part of the end-to-end NHNaaS, and the table illustrates an example of ISP registrations 212 that include the service parameters stored in the NaaS database 204.

At operation 306, the end-to-end NHNaaS receives a request for a connection to a remote service from a user device, the request includes user parameters required for the connection. Referring again to FIG. 1, at (3) network device 102 requests a connection to remote service 104. The request includes the user parameters required for the connection, referring to FIG. 2, user device 208 send a connection request to the end-to-end NHNaaS that includes parameters required for the connection (e.g., transport service, encapsulation, any value-added service required, etc.).

At operation 308, the end-to-end NHNaaS identifies, in the NaaS database, service providers that provide connections having respective service parameters that are compatible with the user parameters. For example, in FIG. 1 at (4) the end-to-end NHNaaS identifies ISPs having registrations in the NaaS database with service parameters that comply with the user parameter requirements specified in the connection request.

At operation 310, the end-to-end NHNaaS determines multiple paths offered by the service providers between the user device and the remote service. Using the service providers identified in operation 308, the end-to-end NHNaaS determines paths between the user device and the remote service that satisfy the required user parameters. Referring again to FIG. 1, at (5) the end-to-end NHNaaS 110 determines multiple paths offered by the service providers between the user device 102 and the remote service 104, path 114 and path 116. Both path 114 and path 116 satisfy the user parameters required for the connection requested by user device 102.

At operation 312, the end-to-end NHNaaS receives network performance data for each path of the multiple paths from a network monitoring service. For instance, in FIG. 1 at (6) the end-to-end NHNaaS 110 receives network performance data from a network monitoring service 112 for path 114 and path 116. Referring to FIG. 2, the end-to-end NHNaaS 202 provides the BGP routing information to the network monitoring service 210 and in return, the network monitoring service 210 sends performance data for each path to the end-to-end NHNaaS 202.

At operation 314, using the network performance data and from the multiple paths, an optimal path for establishing the connection between the user device and the remote service is identified. For example, in FIG. 1 at (7) an optimal path is identified from the multiple paths. In this example, path 114 is identified as an optimal path from the available paths, path 114 and path 116, as path 114 has the best performance data.

At operation 316, the end-to-end NHNaaS transmits a request to service providers along the optimal path to instantiate a tunnel between the user device and the remote service. For example, in FIG. 1, at (8) the end-to-end NHNaaS 110 transmits a request to all the service provider along the optimal path 114, ISP 106(A), ISP 106(B), and ISP 106(D), to instantiate a tunnel between the user device 102 and the remote service 104.

At operation 318, the end-to-end NHNaaS transmits information relating to the tunnel to the user device. For example, in FIG. 1 at (9) the end-to-end NHNaaS 110 transmits the tunnel information to the user device 102. For example, the information may include an encapsulation header, a first HOP identity, a sliceID, and any other information relevant for sending data traffic through the tunnel along the optimal path 114 between the user device 102 and the remote service 104.

Figure 4:
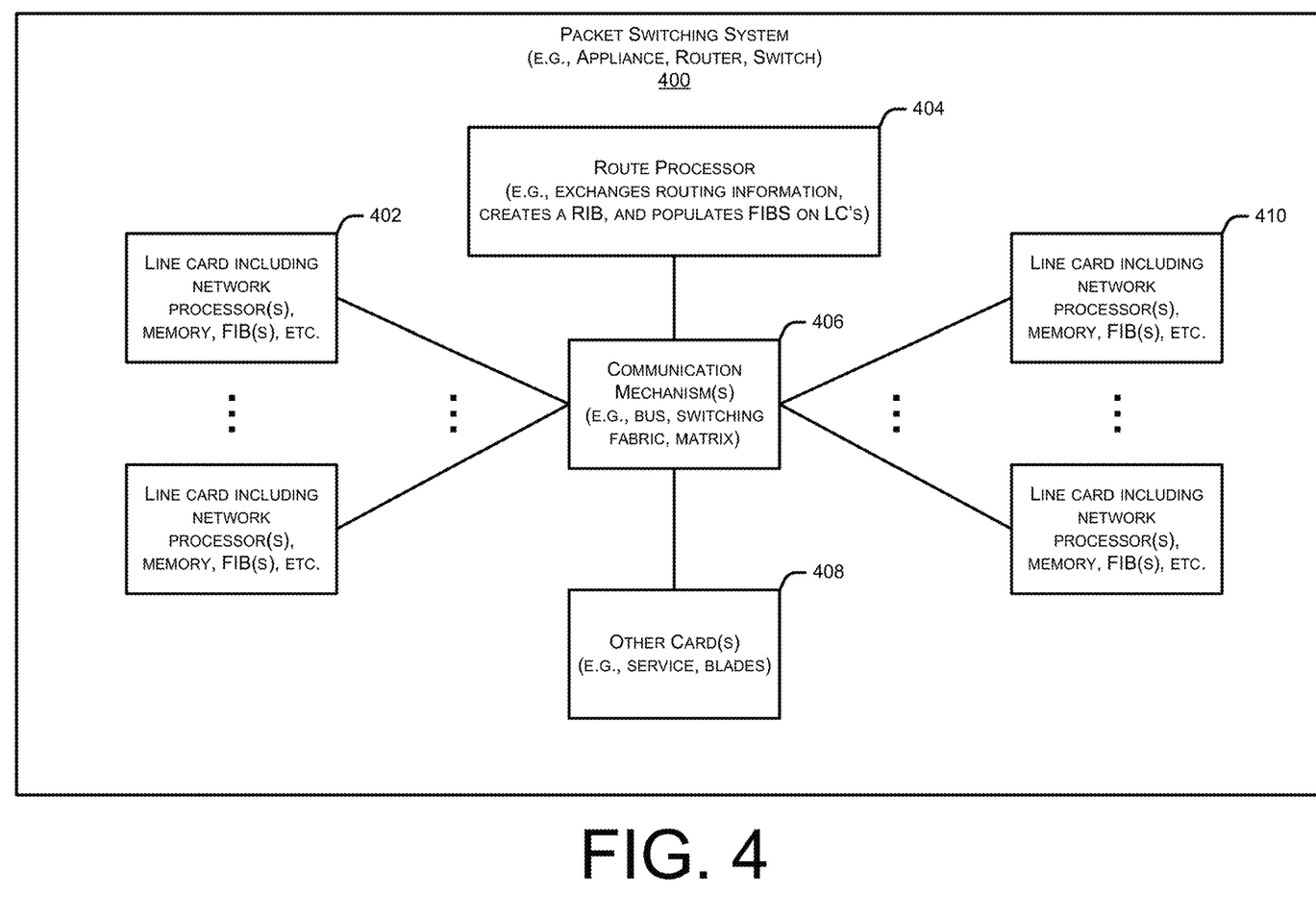
FIG. 4 illustrates a block diagram illustrating an example packet switching system that can be utilized to implement various aspects of the technologies disclosed herein.

FIG. 4 illustrates a block diagram illustrating an example packet switching device (or system) 400 that can be utilized to implement various aspects of the technologies disclosed herein. In some examples, packet switching device(s) 400 may be employed in various networks, such as, for example, the network(s) 106 made up of the network nodes 108 as described with respect to FIG. 1.

In some examples, a packet switching device 400 may comprise multiple line card(s) 402, 410, each with one or more network interfaces for sending and receiving packets over communications links (e.g., possibly part of a link aggregation group). The packet switching device 400 may also have a control plane with one or more processing elements for managing the control plane and/or control plane processing of packets associated with forwarding of packets in a network. The packet switching device 400 may also include other cards 408 (e.g., service cards, blades) which include processing elements that are used to process (e.g., forward/send, drop, manipulate, change, modify, receive, create, duplicate, apply a service) packets associated with forwarding of packets in a network. The packet switching device 400 may comprise hardware-based communication mechanism 406 (e.g., bus, switching fabric, and/or matrix, etc.) for allowing its different entities, line cards 402, 404, 408 and 410 to communicate. Line card(s) 402, 410 may typically perform the actions of being both an ingress and/or an egress line card 402, 410, in regard to multiple other particular packets and/or packet streams being received by, or sent from, packet switching device 400.

Figure 5:
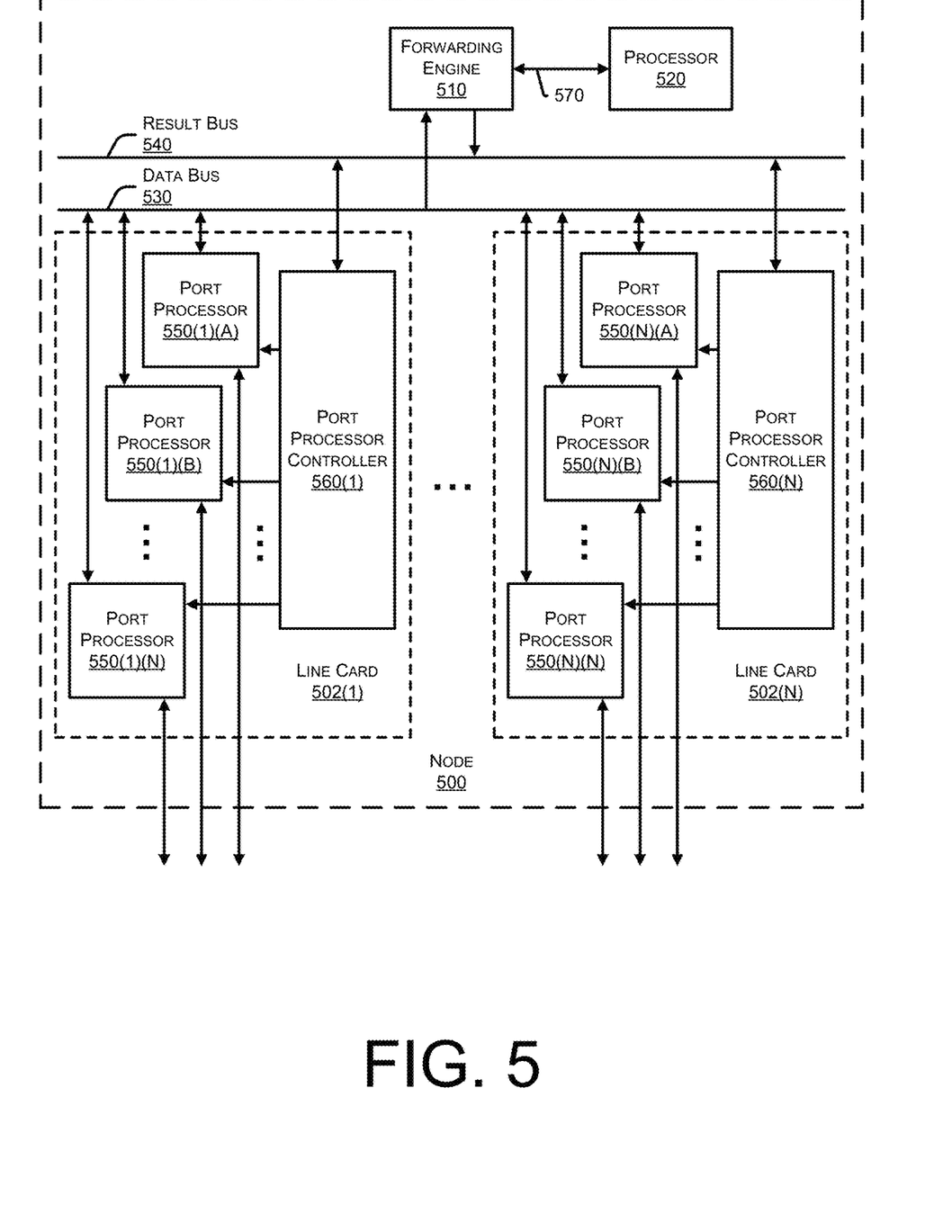
FIG. 5 illustrates a block diagram illustrating certain components of an example node that can be utilized to implement various aspects of the technologies disclosed herein.

FIG. 5 illustrates a block diagram illustrating certain components of an example node 500 that can be utilized to implement various aspects of the technologies disclosed herein. In some examples, node(s) 500 may be employed in various networks, such as, for example, the network(s) 106 made up of the network nodes 108 as described with respect to FIG. 1.

In some examples, node 500 may include any number of line cards 502 (e.g., line cards 502(1)-(N), where N may be any integer greater than 1) that are communicatively coupled to a forwarding engine 510 (also referred to as a packet forwarder) and/or a processor 520 via a data bus 530 and/or a result bus 540. Line cards 802(1)-(N) may include any number of port processors 550(1)(A)-(N)(N) which are controlled by port processor controllers 560(1)-(N), where N may be any integer greater than 1. Additionally, or alternatively, forwarding engine 510 and/or processor 520 are not only coupled to one another via the data bus 530 and the result bus 540, but may also communicatively coupled to one another by a communications link 570.

The processors (e.g., the port processor(s) 550 and/or the port processor controller(s) 560) of each line card 502 may be mounted on a single printed circuit board. When a packet or packet and header are received, the packet or packet and header may be identified and analyzed by node 500 (also referred to herein as a router) in the following manner. Upon receipt, a packet (or some or all of its control information) or packet and header may be sent from one of port processor(s) 550(1)(A)-(N)(N) at which the packet or packet and header was received and to one or more of those devices coupled to the data bus 530 (e.g., others of the port processor(s) 550(1)(A)-(N)(N), the forwarding engine 510 and/or the processor 520). Handling of the packet or packet and header may be determined, for example, by the forwarding engine 510. For example, the forwarding engine 510 may determine that the packet or packet and header should be forwarded to one or more of port processors 550(1)(A)-(N)(N). This may be accomplished by indicating to corresponding one(s) of port processor controllers 560(1)-(N) that the copy of the packet or packet and header held in the given one(s) of port processor(s) 550(1)(A)-(N)(N) should be forwarded to the appropriate one of port processor(s) 550(1)(A)-(N)(N). Additionally, or alternatively, once a packet or packet and header has been identified for processing, the forwarding engine 510, the processor 520, and/or the like may be used to process the packet or packet and header in some manner and/or may add packet security information in order to secure the packet. On a node 500 sourcing such a packet or packet and header, this processing may include, for example, encryption of some or all of the packets or packet and header's information, the addition of a digital signature, and/or some other information and/or processing capable of securing the packet or packet and header. On a node 500 receiving such a processed packet or packet and header, the corresponding process may be performed to recover or validate the packets or packet and header's information that has been secured.

Figure 6:
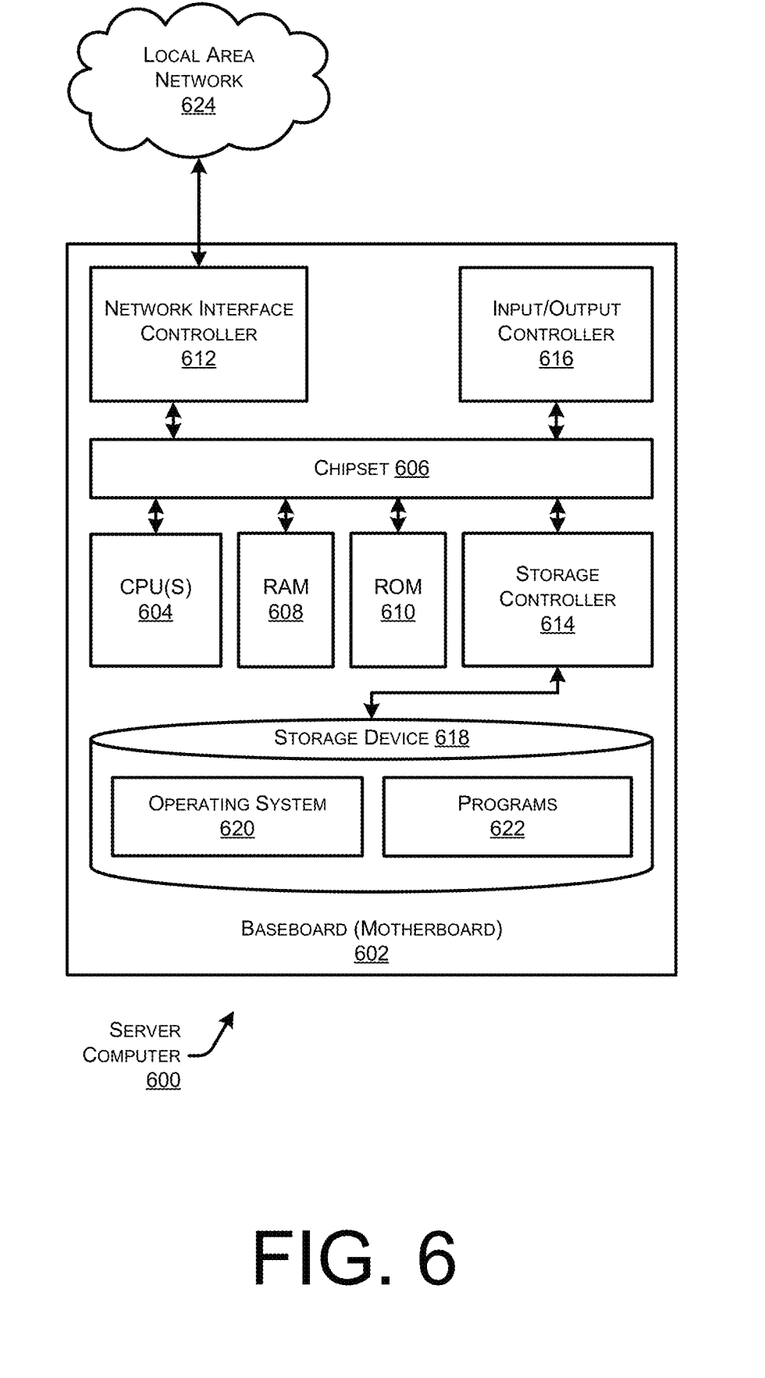
FIG. 6 is a computer architecture diagram showing an illustrative computer hardware architecture for implementing a server device that can be utilized to implement aspects of the various technologies presented herein.

FIG. 6 shows an example computer architecture for a computing device (or network routing device) 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 600 may, in some examples, correspond to a network node(s) 108, the packet switching system 400, and/or the node 500 described herein with respect to FIGS. 1, 4, and 5, respectively.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to startup the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network, such as the network 624. The chipset 606 can include functionality for providing network connectivity through a NIC 612, such as a gigabit Ethernet adapter. The NIC 612 is capable of connecting the computing device 600 to other computing devices over the network 624. It should be appreciated that multiple NICs 612 can be present in the computing device 600, connecting the computer to other types of networks and remote computer systems.

The computing device 600 can be connected to a storage device 618 that provides non-volatile storage for the computing device 600. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by the network device(s) 102-108, and or any components included therein, may be supported by one or more devices similar to computing device 600. Stated otherwise, some or all of the operations performed by the network device(s) 102-108, and or any components included therein, may be performed by one or more computing device 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIG. 3. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least in part by an end-to-end neutral host Network-as-a-service (NaaS) comprising:
   receiving a registration from an internet service provider, the registration including service parameters associated with the internet service provider;
   storing the registration with the service parameters in a NaaS database;
   receiving, from a user device, a request for a connection to a remote service, the request including user parameters required for the connection;
   identifying, in the NaaS database, service providers that provide connections having respective service parameters that are compatible with the user parameters;
   determining multiple paths offered by the service providers between the user device and the remote service;
   receiving, from a network monitoring service, network performance data for each path of the multiple paths;
   identifying, using the network performance data and from the multiple paths, an optimal path for establishing the connection between the user device and the remote service paths;
   transmitting a request to service providers along the optimal path to instantiate a tunnel between the user device and the remote service; and
   transmitting, to the user device, information relating to the tunnel.

2. The method of claim 1, wherein the optimal path is a first optimal path, and the tunnel is a first tunnel and further comprising:
   continuously monitoring the network performance data for each path of the multiple paths;
   based at least in part on the network performance data, determining that the first optimal path is no longer optimal;
   identifying, a second optimal path between the user device and the remote service;
   transmitting a request to service providers along the second optimal path to instantiate a second tunnel between the user device and the remote service;
   transmitting information relating to the second tunnel to the user device; and
   transmitting a teardown message to the service providers along the first optimal path to clear the first tunnel.

3. The method of claim 2, wherein service parameters include:
   transport services that are supported;
   security services that are supported;
   encapsulation that is supported; and
   point-of-presence (POP) locations.

4. The method of claim 1, wherein the user parameters required for the connection are part of service level agreement (SLA) between a user and an internet service provider.

5. The method of claim 1, wherein the internet service providers communicate with the end-to-end neutral host NaaS via a network application programming interface (API).

6. The method of claim 1, wherein the information relating to the tunnel transmitted to the user device comprises:
   an encapsulation header;
   an identity of a first hop; and
   a sliceID.

7. The method of claim 1, wherein the internet service provider is a global service provider, a regional service provider, or a service provider providing services limited to a building.

8. A system comprising:
   one or more processors; and
   one or more computer-readable media storing computer-executable instructions that, when executed by the one or more processors, cause the one or more processors to perform operations comprising:
      receiving, by an end-to-end neutral host network-as-a-service (NHNaaS), a registration from an internet service provider, the registration including service parameters associated with the internet service provider;
      storing the registration with the service parameters in a NaaS database;
      receiving, by the NHNaaS and from a user device, a request for a connection to a remote service, the request including user parameters required for the connection;
      identifying, in the NaaS database, service providers that provide connections having respective service parameters that are compatible with the user parameters;
      determining, by the NHNaaS, multiple paths offered by the service providers between the user device and the remote service;
      receiving, by the NHNaaS and from a network monitoring service, network performance data for each path of the multiple paths;
      identifying, by the NHNaaS, using the network performance data and from the multiple paths, an optimal path for establishing the connection between the user device and the remote service paths;
      transmitting, by the NHNaaS and to service providers along the optimal path, a request to instantiate a tunnel between the user device and the remote service; and
      transmitting, by the NHNaaS and to the user device, information relating to the tunnel.

9. The system of claim 8, wherein the optimal path is a first optimal path, and the tunnel is a first tunnel and the operations further comprising:
- continuously monitoring the network performance data for each path of the multiple paths;
- based at least in part on the network performance data, determining that the first optimal path is no longer optimal;
- identifying, a second optimal path between the user device and the remote service;
- transmitting a request to service providers along the second optimal path to instantiate a second tunnel between the user device and the remote service;
- transmitting information relating to the second tunnel to the user device; and
- transmitting a teardown message to the service providers along the first optimal path to clear the first tunnel.

10. The system of claim 8, wherein service parameters include:
- transport services that are supported;
- security services that are supported;
- encapsulation that is supported; and
- point-of-presence (POP) locations.

11. The system of claim 8, wherein the user parameters required for the connection are part of service level agreement (SLA) between a user and an internet service provider.

12. The system of claim 8, wherein the internet service providers communicate with the end-to-end neutral host NaaS via a network application programming interface (API).

13. The system of claim 8, wherein the information relating to the tunnel transmitted to the user device comprises:
- an encapsulation header;
- an identity of a first hop; and
- a sliceID.

14. The system of claim 8, wherein the internet service provider is a global service provider, a regional service provider, or a service provider providing services limited to a building.

15. One or more non-transitory computer-readable media storing instructions that, when executed, cause one or more processors to perform operations comprising:
- receiving, by an end-to-end neutral host network-as-a-service (NHNaaS), a registration from an internet service provider, the registration including service parameters associated with the internet service provider;
- storing the registration with the service parameters in a NaaS database;
- receiving, by the NHNaaS and from a user device, a request for a connection to a remote service, the request including user parameters required for the connection;
- identifying, in the NaaS database, service providers that provide connections having respective service parameters that are compatible with the user parameters;
- determining, by the NHNaaS, multiple paths offered by the service providers between the user device and the remote service;
- receiving, by the NHNaaS and from a network monitoring service, network performance data for each path of the multiple paths;
- identifying, by the NHNaaS, using the network performance data and from the multiple paths, an optimal path for establishing the connection between the user device and the remote service paths;
- transmitting, by the NHNaaS and to service providers along the optimal path, a request to instantiate a tunnel between the user device and the remote service; and
- transmitting, by the NHNaaS and to the user device, information relating to the tunnel.

16. The one or more non-transitory computer-readable media of claim 15, wherein the optimal path is a first optimal path, and the tunnel is a first tunnel and the operations further comprising:
- continuously monitoring the network performance data for each path of the multiple paths;
- based at least in part on the network performance data, determining that the first optimal path is no longer optimal;
- identifying, a second optimal path between the user device and the remote service;
- transmitting a request to service providers along the second optimal path to instantiate a second tunnel between the user device and the remote service;
- transmitting information relating to the second tunnel to the user device; and
- transmitting a teardown message to the service providers along the first optimal path to clear the first tunnel.

17. The one or more non-transitory computer-readable media of claim 15, wherein service parameters include:
- transport services that are supported;
- security services that are supported;
- encapsulation that is supported; and
- point-of-presence (POP) locations.

18. The one or more non-transitory computer-readable media of claim 15, wherein the user parameters required for the connection are part of service level agreement (SLA) between a user and an internet service provider.

19. The one or more non-transitory computer-readable media of claim 15, wherein the internet service providers communicate with the end-to-end neutral host NaaS via a network application programming interface (API).

20. The one or more non-transitory computer-readable media of claim 15, wherein the information relating to the tunnel transmitted to the user device comprises:
- an encapsulation header;
- an identity of a first hop; and
- a sliceID.

* * * * *